United States Patent
Chemelli et al.

(10) Patent No.: US 10,837,536 B2
(45) Date of Patent: Nov. 17, 2020

(54) DRIVELINE POWER TRANSMITTING COMPONENT WITH A PLATE CLUTCH-TYPE LIMITED SLIP DIFFERENTIAL ASSEMBLY HAVING PRELOAD DISCONNECT CAPABILITIES

(71) Applicant: AMERICAN AXLE & MANUFACTURING, INC., Detroit, MI (US)

(72) Inventors: Douglas J. Chemelli, Royal Oak, MI (US); Ryan Ettenhofer, Detroit, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 44 days.

(21) Appl. No.: 16/257,146

(22) Filed: Jan. 25, 2019

(65) Prior Publication Data
US 2020/0240499 A1    Jul. 30, 2020

(51) Int. Cl.
| F16H 48/08 | (2006.01) |
| F16H 48/22 | (2006.01) |
| F16D 11/14 | (2006.01) |
| F16D 23/12 | (2006.01) |
| F16D 11/00 | (2006.01) |

(52) U.S. Cl.
CPC ............ *F16H 48/08* (2013.01); *F16D 11/14* (2013.01); *F16H 48/22* (2013.01); *F16D 2011/004* (2013.01); *F16D 2023/123* (2013.01); *F16H 2048/085* (2013.01)

(58) Field of Classification Search
None
See application file for complete search history.

(56) References Cited

U.S. PATENT DOCUMENTS

| 3,362,258 A | * | 1/1968 | Thornton | ................ F16H 48/22 |
| | | | | 475/231 |
| 3,587,346 A | * | 6/1971 | Takahashi | ............... F16H 48/08 |
| | | | | 475/240 |
| 4,950,214 A | | 8/1990 | Botterill | |
| 5,098,360 A | | 3/1992 | Hirota | |
| 5,462,497 A | | 10/1995 | Cilano | |
| 5,556,344 A | | 9/1996 | Fox | |
| 5,897,453 A | * | 4/1999 | Mimura | .................. F16D 7/007 |
| | | | | 475/246 |

(Continued)

FOREIGN PATENT DOCUMENTS

DE       1178659       9/1964

*Primary Examiner* — Ernesto A Suarez
*Assistant Examiner* — James J Taylor, II
(74) *Attorney, Agent, or Firm* — Burris Law, PLLC

(57) ABSTRACT

A driveline power transmitting device that includes a limited slip differential having a differential case, a cross-pin, a pair of pressure rings, a pair of clutch packs, a pair of preload springs, and a pair of preload control mechanisms. The pressure rings are non-rotatably coupled to the differential case and are disposed on opposite sides of the cross-pin. The preload springs bias the pressure rings toward the clutch packs and thereby preload the clutch packs. The pressure rings are urged axially away from the cross-pin to further compress the clutch packs in response to rotation of the cross-pin relative to the differential case. The preload control mechanisms are employed to decrease the preload force on the clutch packs in certain situations.

16 Claims, 9 Drawing Sheets

(56) References Cited

U.S. PATENT DOCUMENTS

2012/0252625 A1* 10/2012 Crasset ................. F16H 48/22
                                                              475/231
2017/0328460 A1* 11/2017 Schulte ................. F16H 48/22

* cited by examiner

DRIVELINE POWER TRANSMITTING COMPONENT WITH A PLATE CLUTCH-TYPE LIMITED SLIP DIFFERENTIAL ASSEMBLY HAVING PRELOAD DISCONNECT CAPABILITIES

FIELD

The present disclosure relates to a driveline power transmitting component with a plate clutch-type limited slip differential assembly having preload disconnect capabilities.

BACKGROUND

This section provides background information related to the present disclosure which is not necessarily prior art.

In some vehicle driveline components that have a differential, it can be desirable to configure the differential with a first torque bias ratio (TBR) that is associated with a drive condition, in which rotary power is input to the differential through a differential case and output through a pair of side gears, and a second TBR that is associated with a coast condition in which rotary power is input to the differential through the side gears and output through the differential case. It is known to change the TBR in a limited slip differential using a mechanism for controlling or limiting the compression of the clutch pack(s) and/or using complex friction materials within the clutch pack(s) to provide different TBR's in the drive and coast conditions. These solutions apparently cannot permit the TBR to approach that of an open differential in one of the drive and coast directions.

SUMMARY

This section provides a general summary of the disclosure, and is not a comprehensive disclosure of its full scope or all of its features.

In one form, the present disclosure provides a driveline power transmitting device that includes a differential case, a differential gearset, a pair of clutch packs, a pair of pressure rings, a pair of preload spring sets, a pair of first cams, a pair of first followers, and a pair of preload control mechanisms. The differential gearset is received in the differential case and has a cross-pin, a plurality of differential pinions and a pair of side gears. The differential pinions are rotatably disposed on the cross-pin. Each of the side gears is rotatable about the axis and is meshingly engaged to the differential pinions. The clutch packs are received in the differential case and each of the clutch packs has a plurality of first clutch plates and a plurality of second clutch plates. Each of the first clutch plates is non-rotatably but axially slidably coupled to the differential case, while the second clutch plates are interleaved with the first clutch plates and are non-rotatably but axially slidably coupled to a respective one of the side gears. Each of the pressure rings is non-rotatably but axially slidably coupled to the differential case and is disposed between the cross-pin and a respective one of the clutch packs. Each of the first cams is coupled for rotation with the cross-pin about the axis. Each of the first followers is coupled to an associated one of the pressure rings. Rotation of the cross-pin about the axis in a first rotational direction when the first cams are in contact with the first followers urges the pressure rings along the axis in directions away from the cross-pin. Each of the preload control mechanisms has a second cam, a second follower and a defeat spring. Each of the second cams is coupled to an associated one of the pressure rings. Each of the second followers is rotatably disposed about the axis relative to the pressure rings. The defeat springs bias the second followers about the axis relative to the second cams such that the pressure rings are disposed in neutral positions in which a predetermined preload force is generated by each of the preload springs and transmitted to each of the clutch packs. When the pressure rings are disposed in the neutral positions and rotary power is transmitted through the differential gearset that causes the second followers to rotate about the axis in a second, opposite rotational direction relative to the second cams, the second followers and the second cams cooperate to reduce compression of the preload springs such that forces that are generated by the preload springs and exerted on the clutch packs are relatively lower than the predetermined preload force.

In another form, the present disclosure provides a driveline power transmitting device that includes a differential case, a differential gearset, a pair of clutch packs, a pair of pressure rings, a pair of preload spring sets, a pair of first cams, a pair of first followers, and a pair of preload control mechanisms. The differential gearset is received in the differential case and includes a cross-pin, a plurality of differential pinions and a pair of side gears. The differential pinions are rotatably disposed on the cross-pin. Each of the side gears is rotatable about the axis and is meshingly engaged to the differential pinions. The clutch packs are received in the differential case and have a plurality of first clutch plates and a plurality of second clutch plates. Each of the first clutch plates is non-rotatably but axially slidably coupled to the differential case, while the second clutch plates are interleaved with the first clutch plates and are non-rotatably but axially slidably coupled to a respective one of the side gears. Each of the pressure rings is non-rotatably but axially slidably coupled to the differential case and is disposed between the cross-pin and a respective one of the clutch packs. Each of the first cams is coupled to the cross-pin for rotation about the axis. Each of the first followers is coupled to an associated one of the pressure rings. Rotation of the cross-pin about the axis in a first rotational direction when the first cams are in contact with the first followers urges the pressure rings along the axis in directions away from the cross-pin. Each of the preload control mechanisms has a first member, a second member, and a defeat spring. The first member is rotatable relative to the second member between a neutral position and a preload defeat position. The preload control mechanisms are wider along the axis when in the neutral position than when in the preload defeat position. The defeat springs bias the preload control mechanisms toward the neutral position. Each of the preload control mechanisms is in a respective load path that includes an associated one of the preload springs and an associated one of the clutch packs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
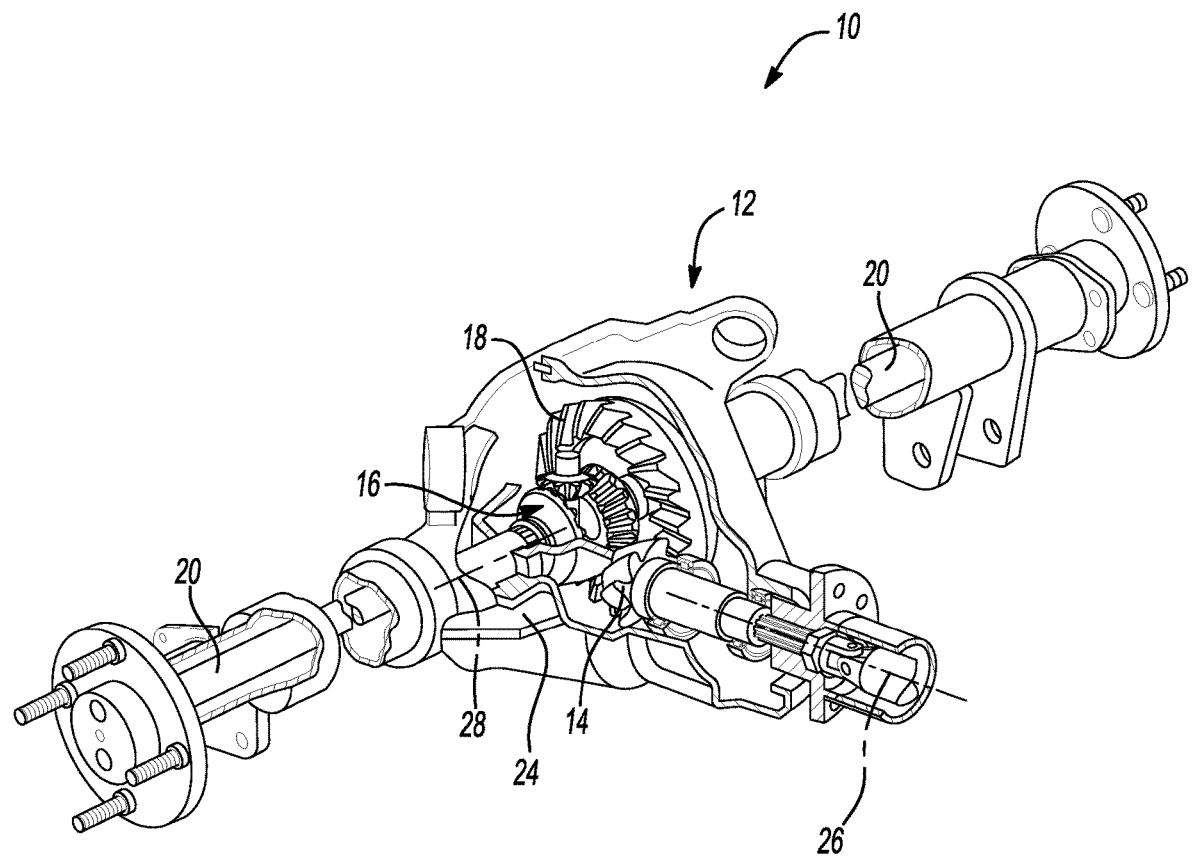
FIG. 1 is a perspective, partly sectioned view of an exemplary vehicle driveline component constructed in accordance with the teachings of the present disclosure.

With reference to FIG. 1, an exemplary vehicle driveline component constructed in accordance with the teachings of the present disclosure is generally indicated by reference numeral 10. In the particular example provided, the vehicle driveline component 10 is a rear axle assembly, but it will be appreciated that the teachings of the present disclosure can be employed in various other vehicle driveline components, including front axle assemblies, transfer cases, center differentials and power take-off units. The vehicle driveline component 10 can include a housing 12, an input pinion 14, a limited slip differential 16, a ring gear 18, and a pair of output shafts 20.

The housing 12 can define a differential cavity 24 into which the input pinion 14, the limited slip differential 16, and the ring gear 18 can be received. The housing 12 can support the input pinion 14 for rotation about an input pinion axis 26. The input pinion 14 is meshed with the ring gear 18 such that rotation of the input pinion 14 about the input pinion axis 26 causes corresponding rotation of the ring gear 18 about a differential axis 28.

Figure 2:
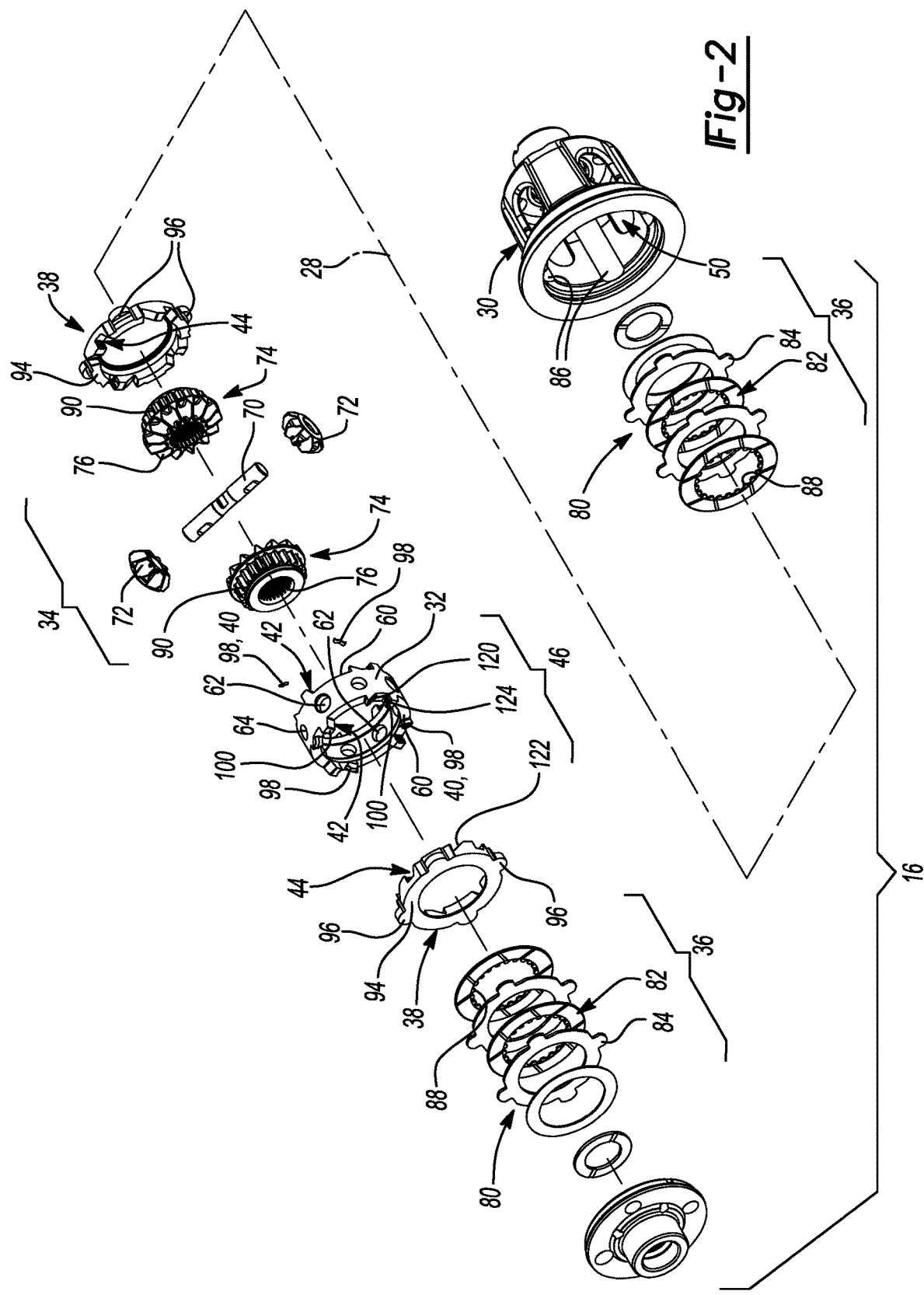
FIG. 2 is an exploded perspective view of a portion of the vehicle driveline component of FIG. 1 illustrating a limited slip differential in more detail.

With reference to FIG. 2, the limited slip differential 16 can include a differential case 30, a center ring 32, a differential gearset 34, a pair of clutch packs 36, a pair of pressure rings 38, a pair of preload springs 40, a pair of first cams 42, a pair of first followers 44, and a pair of preload control mechanisms 46. The differential case 30 can be supported by the housing 12 (FIG. 1) for rotation about the differential axis 28 and can define a case cavity 50 into which the center ring 32, differential gearset 34, the clutch packs 36, the pressure rings 38, the preload springs 40, the first cams 42, the first followers 44 and the preload control mechanisms 46 can be received.

Figure 3:
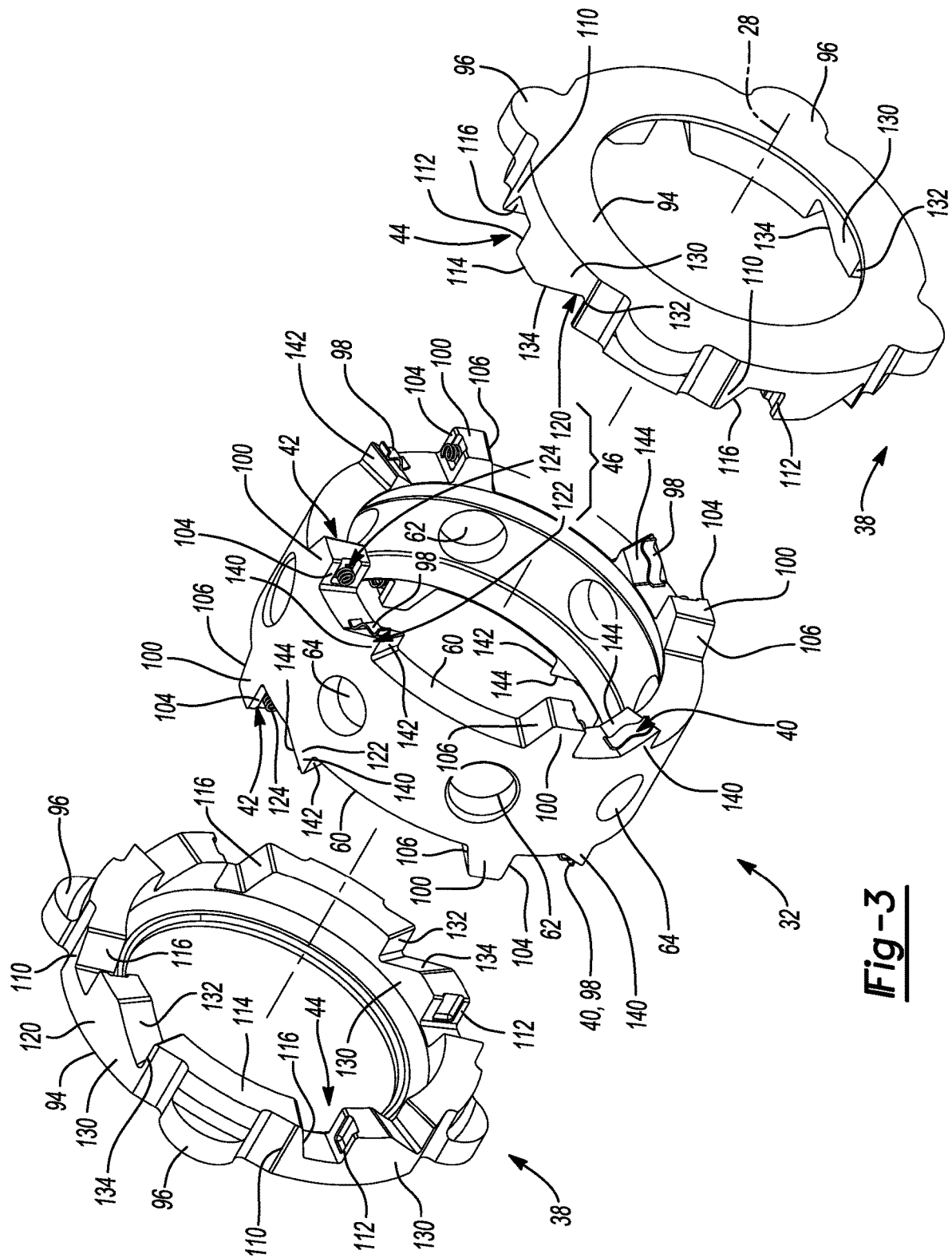
FIG. 3 is an exploded perspective view of a portion of the limited slip differential.

With reference to FIGS. 2 and 3, the center ring 32 is an annular structure having opposite lateral sides 60 and a plurality of cross-pin apertures 62 that can be disposed between the opposite lateral sides 60. Optionally, holes 64 or other features can be formed in the center ring 32 to reduce the mass of the limited slip differential 16, and/or to facilitate the ingress of lubricant into or egress of lubricant from the into the interior of the center ring 32. The center ring 32 is disposed in the case cavity 50 and is rotatable about the differential axis 28 relative to the differential case 30.

The differential gearset 34 can include a cross-pin 70, a plurality of differential pinions 72 and a pair of side gears 74. The cross-pin 70 can be received through two of the cross-pin apertures 62 in the center ring 32 to mount the cross-pin to the center ring 32 for rotation with the center ring 32 about the differential axis 28. The cross-pin 70 can extend perpendicular to the differential axis 28. Each of the differential pinions 72 can be received in the interior of the center ring 32 and can be rotatably disposed about the cross-pin 70. Each of the side gears 74 can be rotatably disposed about the differential axis 28 and can be meshingly engaged with the differential pinions 72. The side gears 74 can have an internally splined aperture 76.

Each of the clutch packs 36 can be disposed along the differential axis 28 between an associated lateral side 60 of the center ring 32 and an associated axial end of the differential case 30. Each of the clutch packs 36 can have a plurality of first clutch plates 80 and a plurality of second clutch plates 82. The first clutch plates 80 can have a plurality of lobes 84 that can be received into corresponding grooves 86 formed into the differential case 30. The lobes 84 cooperate with the grooves 86 to non-rotatably but axially slidably couple the first clutch plates 80 to the differential case 30. The second clutch plates 82 can be interleaved with the first clutch plates 80 and can have an internally splined aperture 88 that can matingly engage a male splined segment 90 on an associated one of the side gears 74 to thereby non-rotatably but axially slidably couple the second clutch plates 82 to the associated one of the side gears 74.

Each of the pressure rings 38 can be disposed along the differential axis 28 between an associated lateral side 60 of the center ring 32 and an associated one of the clutch packs 36. Each pressure ring 38 can include an annular ring body 94 and a plurality of tabs 96 that extend outwardly from the annular ring body 94. The tabs 96 can be received into the grooves 86 in the differential case 30 to thereby non-rotatably but axially slidably couple the pressure rings 38 to the differential case 30.

Each of the preload springs 40 is disposed in a load path that includes a respective one of the clutch packs 36. The preload springs 40 can be any type of spring, such as Belleville spring washers, annular wave springs, or helical coil compression springs, and can be disposed in any desired location between the differential case 30 and an associated lateral side 60 of the center ring 32. In the particular example provided, each of the preload springs 40 comprises a plurality of linear wave springs 98.

Figure 4:
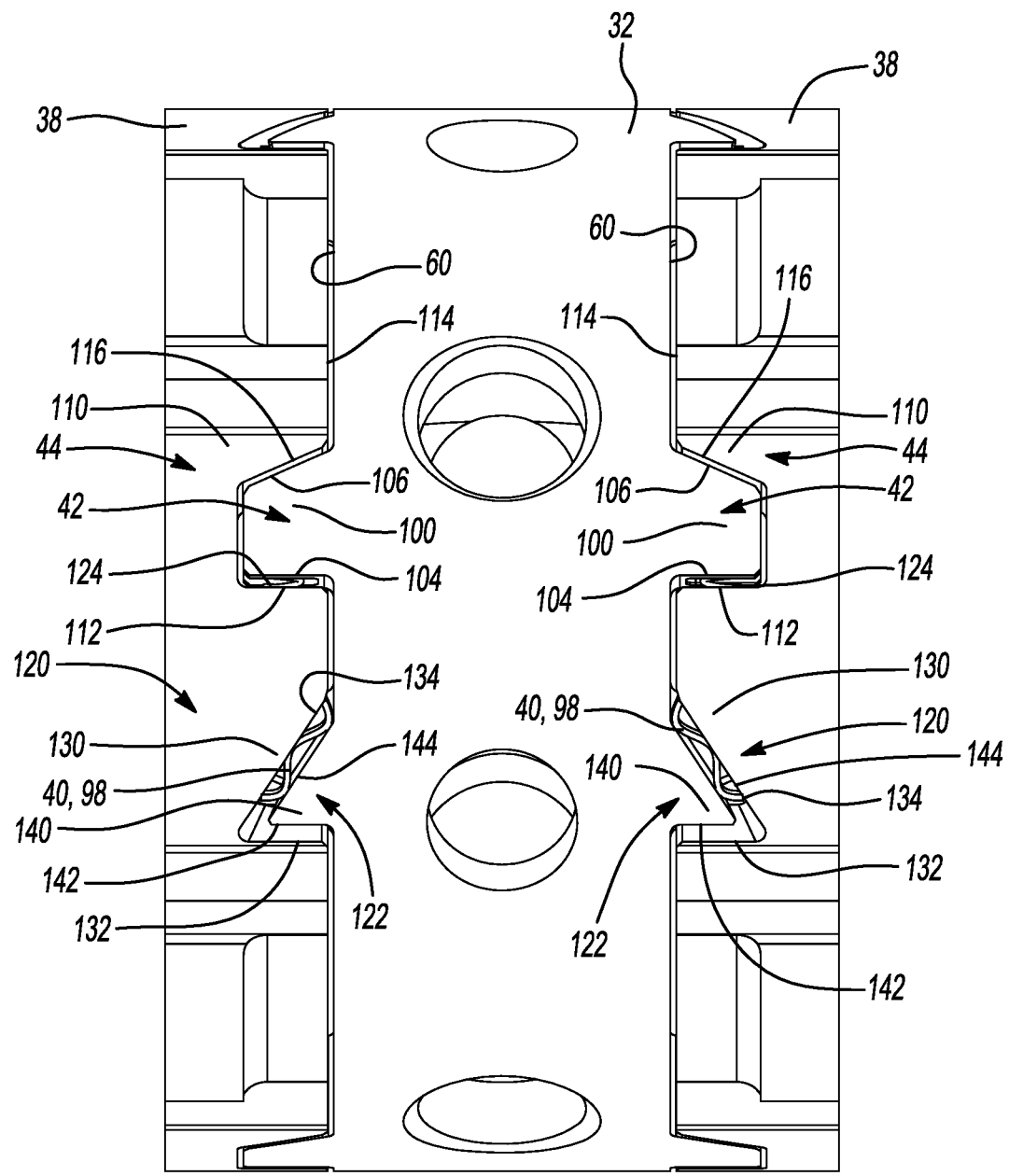
FIG. 4 is a front plan view of the portion of the limited slip differential that is shown in FIG. 3.

With reference to FIGS. 3 and 4, the first cams 42 are coupled to the opposite lateral sides 60 of the center ring 32. In the particular example provided, each of the first cams 42 includes four cam members 100 that extend laterally outward from an associated one of the lateral sides 60 on the center ring 32 and which are spaced circumferentially apart from one another about the differential axis 28. Each of the cam members 100 can include a rear wall 104, which can be disposed in an associated plane that is generally parallel to the differential axis 28, and a cam surface 106 that can taper toward the rear wall 104 with increasing distance from the lateral side 60 from which the cam member 100 extends.

Each of the first followers 44 is coupled to an associated one of the pressure rings 38 and comprises a plurality of follower structures 110 that are configured to cooperate with the cam members 100 to control movement of the pressure rings 38 along the differential axis 28 based on a rotational position of the center ring 32 and the first cams 42. In the example provided, each of the first followers 44 comprises four follower structures 110 that are generally formed as pockets or recesses in an associated one of the pressure rings 38 that are configured to receive the cam members 100. Each follower structure 110 can have a rear wall 112, which can extend into a lateral face 114 of the associated one of the pressure rings 38 in an associated plane that is generally parallel to the differential axis 28, and a follower wall 116 that can extend into the lateral face 114 of the associated one of the pressure rings 38 in a manner that tapers toward the rear wall 112 with increasing distance from the lateral face 114.

The cam members 100 of the first cams 42 can be nested into the follower structures 110 in the first followers 44 such that the cam surface 106 and the rear wall 104 of each cam member 100 is received between the follower wall 116 and the rear wall 112 of a respective one of the follower structures 110. The circumferential spacing between the follower wall 116 and the rear wall 112 of each of the follower structures 110 is somewhat larger than the circumferential spacing between the cam surface 106 and the rear wall 104 of each cam member 100.

Each of the preload control mechanisms 46 is disposed in a respective one of the load paths and has a width that can be varied to correspondingly vary an amount by which an associated one of the preload springs 40 is compressed. Accordingly, it will be appreciated that the load exerted by the preload springs 40 can be varied by varying the width of the preload control mechanisms 46.

Each of the preload control mechanisms 46 can include a second cam 120, a second follower 122 and a defeat spring 124. Each of the second cams 120 can be coupled to an associated one of the pressure rings 38 and can include a plurality of cam structures 130 that can be generally formed as pockets or recesses in the pressure rings 38. In the example provided, each of the second cams 120 includes four cam structures 130 that are evenly spaced apart about the circumference of the lateral face 114 of an associated one of the pressure rings 38 and each of the cam structures 130 is disposed circumferentially between a pair of the follower structures 110. Each of the cam structures 130 can define a rear wall 132, which can extend into the lateral face 114 of the associated one of the pressure rings 38 in an associated plane that is generally parallel to the differential axis 28, and a cam surface 134 that can extend into the lateral face 114 of the associated one of the pressure rings 38 in a manner that tapers toward the rear wall 132 with increasing distance from the lateral face 114.

Each of the second followers 122 can be coupled to the opposite lateral sides 60 of the center ring 32. In the particular example provided, each of the second followers 122 includes four follower members 140 that extend laterally outward from an associated one of the lateral sides 60 on the center ring 32 and which are spaced circumferentially apart from one another about the differential axis 28 such that each of the follower members 140 is disposed circumferentially between a pair of the cam members 100. Each of the follower members 140 can include a rear wall 142, which can be disposed in a plate that is generally parallel to the differential axis 28, and a follower surface 144 that can taper toward the rear wall 142 with increasing distance from the lateral side 60 of the center ring 32 from which the follower member 140 extends. Each of the second followers 122 can be nested into an associated one of the second cams 120 such that each of the follower members 140 is received into an associated one of the cam structures 130 so that the rear wall 132 of each of the cam structures 130 is disposed proximate to the rear wall 142 of an associated one of the follower members 140 and the cam surface 134 of each of the cam structures 130 is disposed proximate to the follower surface 144 of an associated one of the follower members 140.

Each of the defeat springs 124 can bias one of the second followers 122 about the differential axis 28 in a first rotational direction about the differential axis 28 relative to the second cam 120 that is nested into the second follower 122. More specifically, each of the defeat springs 124 can bias the second followers 122 (and the center ring 32 therewith) in the first rotational direction to urge the cam surfaces 106 on the cam members 100 into engagement with the follower walls 116 of the follower structures 110. In the example provided, each of the defeat springs 124 comprises a plurality of helical coil compression springs that are disposed circumferentially between the rear wall 112 in one of the follower structures 110 in the first follower 44 and the rear wall 104 in the cam member 100 of the first cam members 100 that is nested into the follower structure 110. It will be appreciated however, that the defeat springs 124 could be configured differently. For example, the defeat springs 124 could be torsion springs.

Each of the linear wave springs 98 is disposed between a cam surface 134 of one of the cam structures 130 and a follower surface 144 on one of the follower members 140. The linear wave springs 98 urge the pressure rings 38 apart from the center ring 32 along the differential axis 28. Although the preload springs 40 have been illustrated and described as being generally located between the pressure rings 38 and the center ring 32, and more specifically as being located between the second cams 120 and the second followers 122, it will be appreciated that each of the preload springs 40 can be disposed anywhere in a respective one of the load paths between the center ring 32 and a respective end of the differential case 30. Accordingly, the preload springs 40 can be disposed between respective ends of the differential case 30 and a respective one of the clutch packs 36, or between a respective one of the clutch packs 36 and a respective one of the pressure rings 38.

With reference to FIGS. 2 and 3, when no rotational power is transmitted through the limited slip differential 16, the defeat springs 124 bias the center ring 32 about the differential axis 28 such that the cam surfaces 106 on the cam members 100 engage or are disposed proximate the follower walls 116 of the follower structures 110 and each of the preload springs 40 exerts a predetermined preload force that urges the pressure rings 38 away from the center ring 32, which urges the first and second clutch plates 80 and 82 of each clutch pack 36 into engagement with one another. In this condition (hereinafter "the base condition"), the lateral face 114 of each of the pressure rings 38 is spaced apart from an associated one of the lateral sides 60 of the center ring 32 by an initial amount.

It will be appreciated that the preload force that is applied to the clutch packs 36 permits each of the clutch packs 36 to carry a first predetermined rotational load (torque). Consequently, each of the clutch packs 36 will inhibit speed differentiation between an associated one of the side gears 74 and the differential case 30 when rotary power having a magnitude that is less than or equal to the first predetermined rotational load is transmitted in the first rotational direction from the differential case 30 to the associated one of the side gears 74.

When rotary power is transmitted through the limited slip differential 16 in the first rotational direction and the magnitude of the rotary power that is transmitted from the differential case 30 to the side gears 74 increases beyond the first predetermined rotational load, reaction forces exerted through the differential pinions 72 and the cross-pin 70 to the center ring 32 cause the center ring 32 to rotate in the first rotational direction relative to the differential case 30. The rotation of the center ring 32 in the first rotational direction relative to the differential case 30 drives the cam surfaces 106 on the cam members 100 against the follower walls 116 of the follower structures 110 to thereby urge the pressure rings 38 along the differential axis 28 away from the center ring 32 (i.e., so that the spacing between the lateral face 114 of each of the pressure rings 38 is spaced apart from the associated lateral side 60 of the center ring 32 by a distance that exceeds the initial amount). The translation of the pressure rings 38 away from the center ring 32 further compresses the clutch packs 36, which increases the magnitude of the rotary power that can be transmitted between the differential case 30 and each of the side gears 74 before either of the side gears 74 is permitted to rotate relative to the differential case 30.

When transmission of the rotary power through the limited slip differential 16 in the first rotational direction is reversed (i.e., when rotary power transmitted in the first rotational direction is input to the limited slip differential 16 through the side gears 74), such as when a vehicle with the limited slip differential 16 transitions from a drive condition to a coast condition, reaction forces that are exerted through the differential pinions 72 and the cross-pin 70 to the center ring 32 will subside and the center ring 32 will rotate in the second rotational direction relative to the differential case 30 as needed to position the center ring 32 in the baseline condition.

When the magnitude of the rotary power that is input to the limited slip differential 16 in the first rotational direction through the side gears 74 is below the first predetermined rotational load, the defeat springs 124 inhibit relative rotation between the center ring 32 and the differential case 30. In this condition, the cam surfaces 134 of the cam structures 130 of the second cams 120 are nested into the follower members 140 of the second followers 122 so that the lateral face 114 of each of the pressure rings 38 is spaced apart from an associated one of the lateral sides 60 of the center ring 32 by the initial amount. Consequently, each of the preload springs 40 exerts the predetermined preload force that drives the pressure rings 38 away from the center ring 32 to cause engagement between the first and second clutch plates 80 and 82 of each clutch pack 36 with one another. Consequently, the clutch packs 36 inhibit relative rotation between the side gears 74 and the differential case 30 when the magnitude of the rotary power that is transmitted in the first rotational direction from each side gear 74 to the differential case 30 is less than or equal to the first predetermined rotational load.

When the magnitude of the rotary power that is input to the limited slip differential 16 in the first rotational direction through the side gears 74 exceeds the first predetermined rotational load, the center ring 32 is able to rotate in the second rotational direction relative to the differential case 30, causing the follower surfaces 144 on the follower members 140 of the second followers 122 to slide along the cam surfaces 134 of the cam structures 134 of the second cams 120 such that the cam structures 134 nest more deeply into the follower members 140 (due to the correspondingly helical or axially tapered configuration of the cam surfaces 134 and the follower surfaces 144). This reduces the spacing between the lateral face 114 of each of the pressure rings 38 and an associated one of the lateral sides 60 of the center ring 32 so that the spacing between the lateral face 114 of each of the pressure rings 38 and an associated one of the lateral sides 60 of the center ring 32 is smaller than the initial amount. This reduction in the spacing between the lateral faces 114 of the pressure rings 38 and the lateral sides 60 of the center ring 32 correspondingly reduces the compression of the preload springs 40, which correspondingly lowers the force that is exerted by the preload springs 40 to engage the first and second clutch plates 80 and 82 of each clutch pack 36 with one another. As such, the rotational load that can be carried by each of the clutch packs 36 (i.e., the magnitude of the torque that can be transmitted through a corresponding one of the side gears 74 before speed differentiation between the side gear 74 and the differential case 30 is permitted) is relatively lower than the first predetermined rotational load. Full contracting of the defeat springs 124, which may result in contact between the rear walls 104 of the first cam members 100 and the rear walls 112 of the follower structures 110.

From the above discussion, it will be appreciated that the torque bias ratio of the limited slip differential can be preset to a desired magnitude for situations in which the It would be possible to reduce or completely eliminate the preload force provided by the preload springs 40 with sufficient rotation of the center ring 32 in the second rotational direction relative to the differential case 30.

Figure 5:
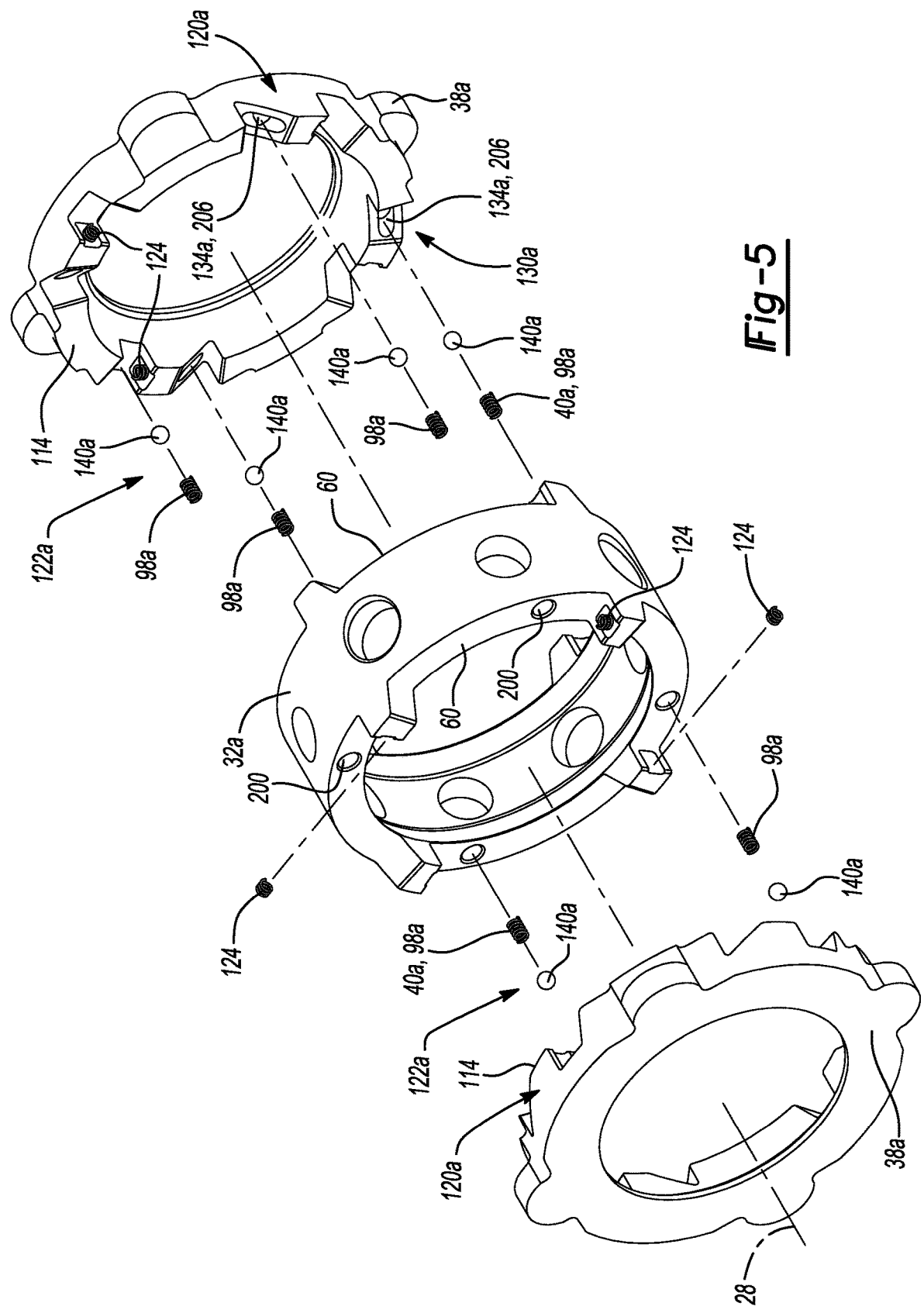
FIG. 5 is an exploded perspective view that depicts a first alternately configured portion of the limited slip differential.
Figure 6:
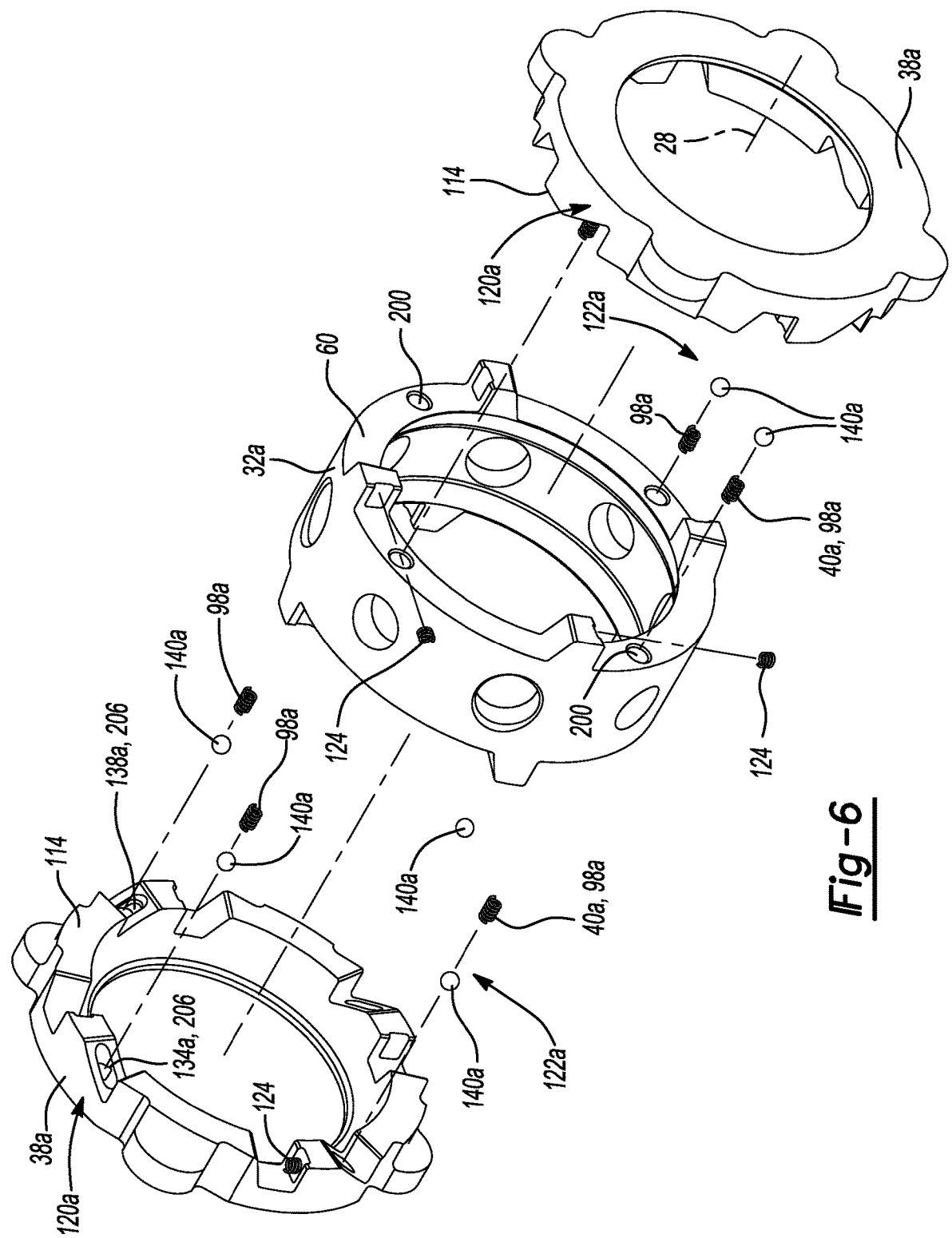
FIG. 6 is an exploded perspective view that depicts a second alternately configured portion of the limited slip differential.

With reference to FIGS. 5 and 6, a first alternate set of preload control mechanisms 46a are illustrated in association with the center ring 32a. In this example, the preload springs 40a comprise helical coil compression springs 98a that are received into bores 200 formed into a respective one of the lateral sides 60 of the center ring 32a, each of the cam structures 130a on the pressure rings 38a defines a pocket or recess 206 that defines a corresponding one of the cam surfaces 134a, and the second follower members 140a of each of the second followers 122a comprise spherical balls that are received in the recesses 206 and biased by the helical coil compression springs 98a away from the center ring 32a and against the cam surfaces 134a. Each of the cam surfaces 134a is helical about the differential axis 28 or tapers away from the lateral surface 114 of the pressure ring 38a to permit the second followers 122a to nest more deeply into the second cams 120a when the center ring 32a rotates in the second rotational direction away from the baseline condition.

Figure 7:
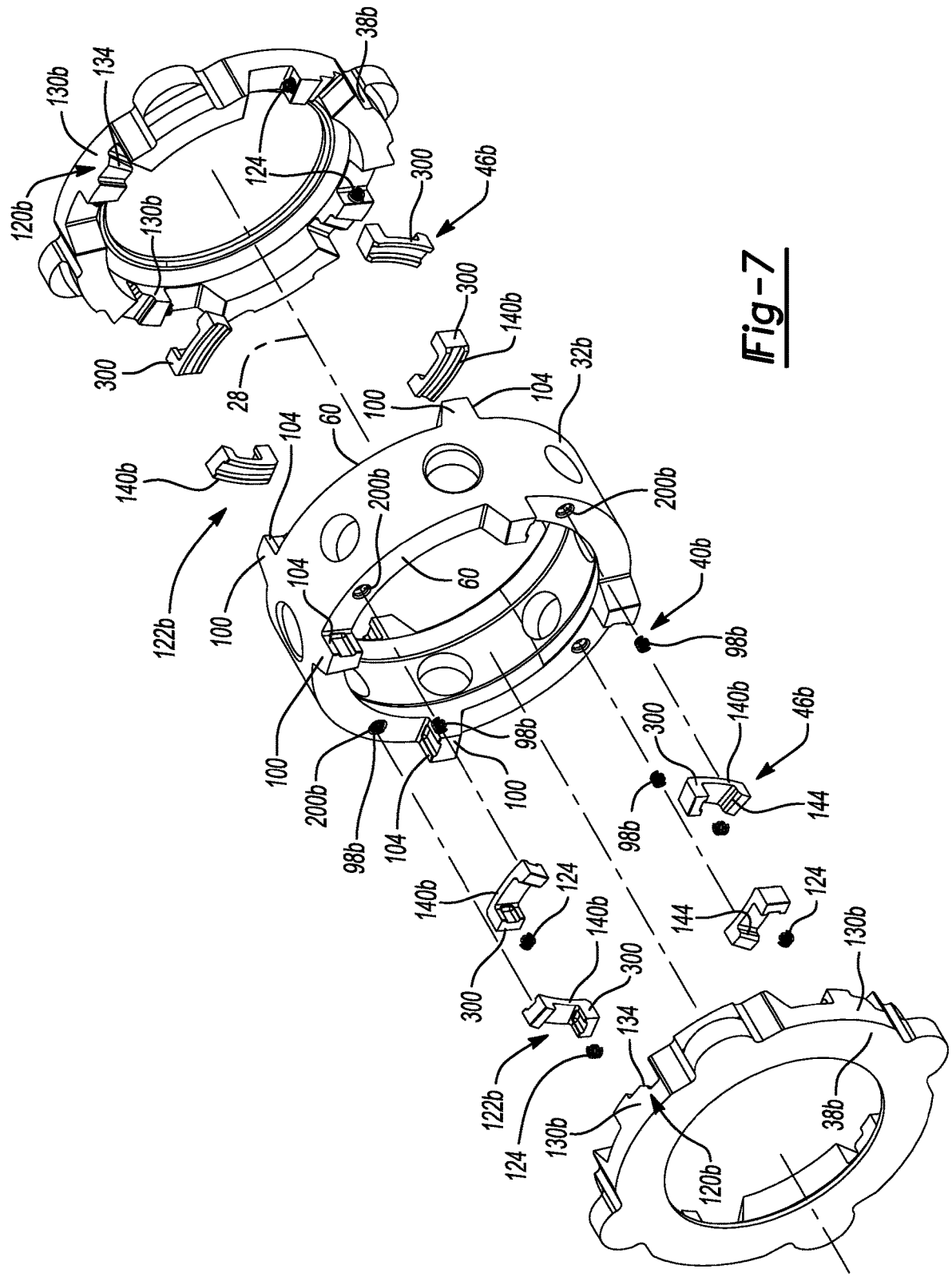
FIG. 7 is an exploded perspective view that depicts a third alternately configured portion of the limited slip differential.
Figure 8:
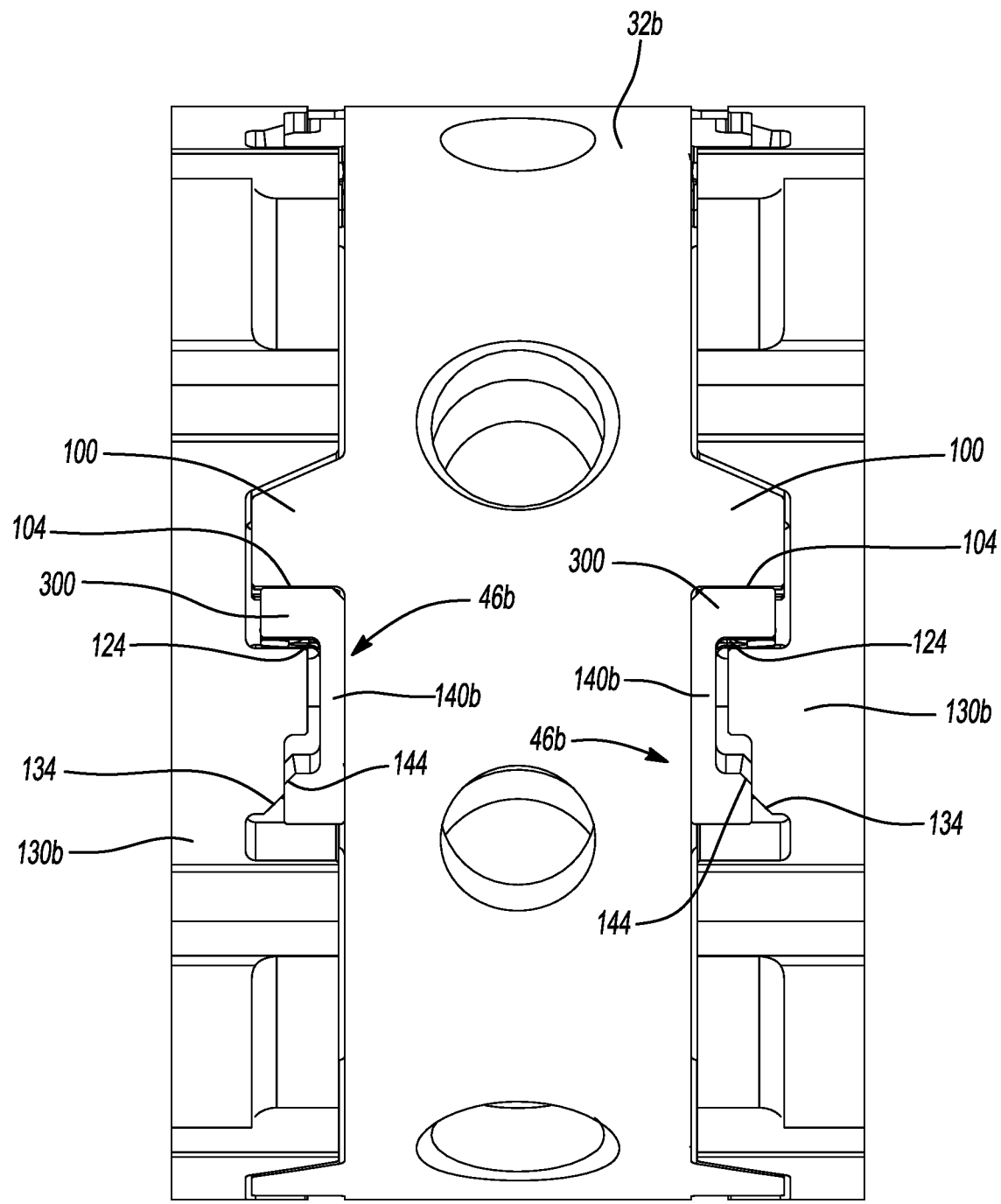
FIG. 8 is a front plan view of the portion of the limited slip differential shown in FIG. 7.

With reference to FIGS. 7 and 8, a second alternate set of preload control mechanisms 46b are illustrated in association with the center ring 32b. In this example, the preload springs 40b comprise helical coil compression springs 98b that are received into bores 200b formed into a respective one of the lateral sides 60 of the center ring 32b, each of the second followers 122b comprises a plurality of discrete follower members 140b that are disposed axially between a corresponding one of the lateral sides 60 of the center ring 32b and the cam structures 130b of the second cams 120b on the pressure ring 38b. The follower members 140b are biased toward an associated one of the cam structures 130 by a corresponding one of the helical compression springs 98b. Each of the second followers 122b comprises a foot 300 that is received between a corresponding one of the defeat springs 124 and the rear wall 104 of a corresponding one of the first cam members 100. It will be appreciated that the follower members 140b are configured to move with the center ring 32b in a circumferential direction about the differential axis 28 relative to the pressure rings 38b and that movement of the follower members 140b in the second rotational direction away from the baseline condition will permit the cam structures 130b to nest more deeply into the second followers 122b.

Figure 9:
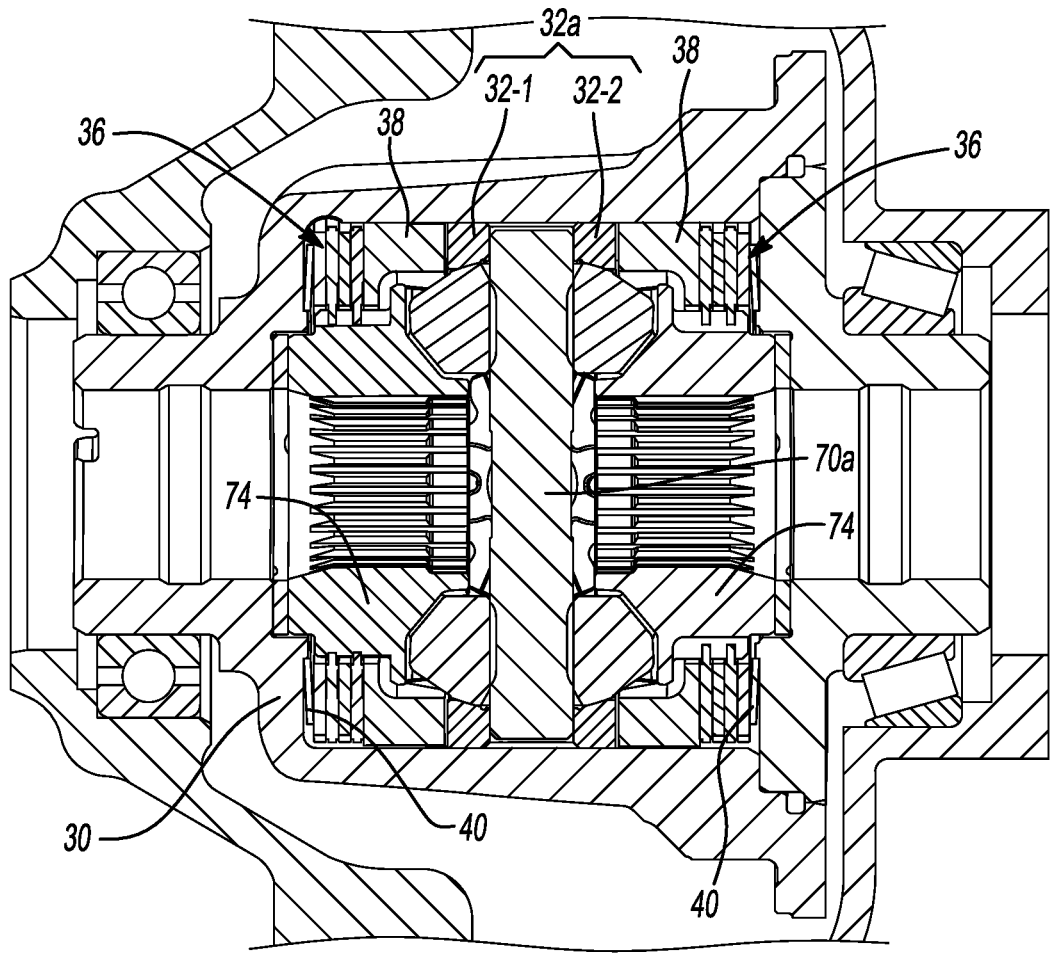
FIG. 9 is a cross-section of an alternately configured limited slip differential.
Figure 10:
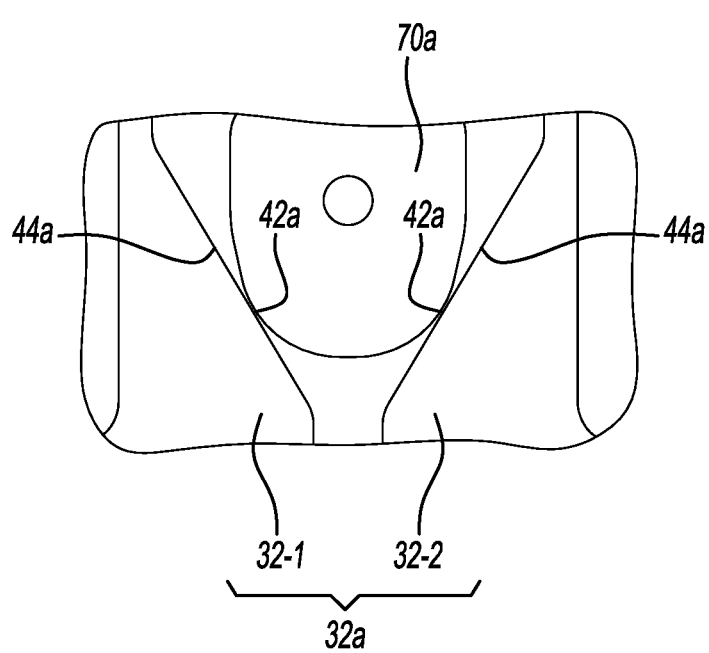
FIG. 10 is a top view of a portion of the limited slip differential of FIG. 9.

While the limited slip differential 16 has been illustrated and described as including a center ring 32 to which the first cams 42 and the second followers 122 are coupled and to which the cross-pin 70 is non-rotatably coupled, it will be appreciated that the center ring 32a could be split into two pieces 32-1 and 32-2, that the first cams 42a could be mounted directly to (e.g., unitarily and integrally formed with) the cross-pin 70a, and that each of the first followers 44a could be coupled to an associated one of the pieces 32-1 and 32-2 of the center ring 32a as is shown in the examples of FIGS. 9 and 10. Additionally, each of the preload springs 40 is disposed between one of the side gears 74 and an internal surface of the differential case 30. In this example, each of the preload springs 40 comprises a Belleville spring washer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline power transmitting device comprising:
a differential case;
a differential gearset received in the differential case, the differential gearset having a cross-pin, a plurality of differential pinions and a pair of side gears, the differential pinions being rotatably disposed on the cross-pin, each of the side gears being rotatable about an axis and meshingly engaged to the differential pinions;
a pair of clutch packs received in the differential case, each of the clutch packs having a plurality of first clutch plates and a plurality of second clutch plates, each of the first clutch plates being non-rotatably but axially slidably coupled to the differential case, each of the second clutch plates being interleaved with the first clutch plates and being non-rotatably but axially slidably coupled to a respective one of the side gears;
a pair of pressure rings, each of the pressure rings being non-rotatably but axially slidably coupled to the differential case and being disposed between the cross-pin and a respective one of the clutch packs;
a pair of preload spring sets;
a pair of first cams, each of the first cams being coupled for rotation with the cross-pin about the axis;
a pair of first followers, each of the first followers being coupled to an associated one of the pressure rings, wherein rotation of the cross-pin about the axis in a first rotational direction when the first cams are in contact with the first followers urges the pressure rings along the axis in directions away from the cross-pin; and
a pair of preload control mechanisms, each of the preload control mechanisms having a second cam, a second follower and a defeat spring, each of the second cams being coupled to an associated one of the pressure rings, each of the second followers being rotatably disposed about the axis relative to the pressure rings, the defeat springs biasing the second followers about the axis relative to the second cams such that the pressure rings are disposed in neutral positions in which a predetermined preload force is generated by each of the preload springs and transmitted to each of the clutch packs;
wherein when the pressure rings are disposed in the neutral positions and rotary power is transmitted through the differential gearset that causes the second followers to rotate about the axis in a second, opposite rotational direction relative to the second cams, the second followers and the second cams cooperate to reduce compression of the preload springs such that forces that are generated by the preload springs and exerted on the clutch packs are relatively lower than the predetermined preload force.

2. The driveline power transmitting device of claim 1, wherein each of the preload springs is disposed along the axis between the cross-pin and an associated one of the pressure rings.

3. The driveline power transmitting device of claim 2, wherein the preload springs are disposed along the axis between the second cams and the second followers.

4. The driveline power transmitting device of claim 2, wherein the preload springs bias the second followers away from the cross-pin.

5. The driveline power transmitting device of claim 1, wherein the second cams are non-rotatably coupled to the pressure rings and the second followers are movably coupled to the cross-pin.

6. The driveline power transmitting device of claim 5, wherein the second followers are non-rotatably but axially movably coupled to the cross-pin.

7. The driveline power transmitting device of claim 5, wherein the second followers are rotatably and axially movably coupled to the cross-pin.

8. The driveline power transmitting device of claim 1, wherein the second followers are received into detents formed in the second cams when the pressure rings are in the neutral positions.

9. The driveline power transmitting device of claim 1, wherein the preload springs comprise linear wave springs that are disposed between the second followers and the second cams.

10. The driveline power transmitting device of claim 1, wherein the preload springs comprise a plurality of helical compression springs mounted to the cross-pin.

11. The driveline power transmitting device of claim 10, wherein the second followers comprise follower elements that are received on ends of the helical compression springs that are opposite the cross-pin.

12. The driveline power transmitting device of claim 11, wherein the follower elements comprise spherical balls.

13. The driveline power transmitting device of claim 10, wherein the second followers comprise discrete structures that are assembled axially and rotationally between the cross-pin and the pressure rings.

14. The driveline power transmitting device of claim 1, further comprising a center ring disposed within the differential case between the pressure rings and rotatable relative to the differential case about the axis, the cross-pin being non-rotatably coupled to the center ring, the first cams extending from opposite lateral sides of the center ring.

15. A driveline power transmitting device comprising:
a differential case;
a differential gearset received in the differential case, the differential gearset having a cross-pin, a plurality of differential pinions and a pair of side gears, the differential pinions being rotatably disposed on the cross-pin, each of the side gears being rotatable about an axis and meshingly engaged to the differential pinions;

a pair of clutch packs received in the differential case, each of the clutch packs having a plurality of first clutch plates and a plurality of second clutch plates, each of the first clutch plates being non-rotatably but axially slidably coupled to the differential case, each of the second clutch plates being interleaved with the first clutch plates and being non-rotatably but axially slidably coupled to a respective one of the side gears;

a pair of pressure rings, each of the pressure rings being non-rotatably but axially slidably coupled to the differential case and being disposed between the cross-pin and a respective one of the clutch packs;

a pair of preload spring sets;

a pair of first cams, each of the first cams being coupled to the cross-pin for rotation about the axis;

a pair of first followers, each of the first followers being coupled to an associated one of the pressure rings, wherein rotation of the first cams about the axis in a first rotational direction when the first cams are in contact with the first followers urges the pressure rings along the axis in directions away from the cross-pin; and a pair of preload control mechanisms, each of the preload control mechanisms having a first member, a second member, and a defeat spring, the first member being rotatable relative to the second member between a neutral position and a preload defeat position, wherein the preload control mechanisms are wider along the axis when in the neutral position than when in the preload defeat position, the defeat springs biasing the preload control mechanisms toward the neutral position, wherein each of the preload control mechanisms is in a respective load path that includes an associated one of the preload springs and an associated one of the clutch packs.

16. The driveline power transmitting device of claim 15, further comprising a center ring disposed within the differential case between the pressure rings and rotatable relative to the differential case about the axis, the cross-pin being non-rotatably coupled to the center ring, the first cams extending from opposite lateral sides of the center ring.

* * * * *